(12) United States Patent
Daoud

(10) Patent No.: US 6,816,663 B2
(45) Date of Patent: Nov. 9, 2004

(54) UNITARY FAN-OUT DEVICE FOR OPTICAL RIBBON CABLES

(75) Inventor: Bassel H. Daoud, Parsippany, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/408,468

(22) Filed: Apr. 7, 2003

(65) Prior Publication Data
US 2004/0197066 A1 Oct. 7, 2004

(51) Int. Cl.[7] .............................................. G02B 6/00
(52) U.S. Cl. ...................................................... 385/136
(58) Field of Search ................................ 385/134, 135, 385/136

(56) References Cited

U.S. PATENT DOCUMENTS

| | | | | |
|---|---|---|---|---|
| 4,666,240 A | * | 5/1987 | Caron et al. | 385/135 |
| 4,773,729 A | * | 9/1988 | Mignien | 385/135 |
| 5,146,532 A | * | 9/1992 | Hodge | 385/136 |
| 5,471,555 A | * | 11/1995 | Braga et al. | 385/136 |
| 5,734,777 A | * | 3/1998 | Merriken et al. | 385/135 |
| 6,571,048 B1 | * | 5/2003 | Bechamps et al. | 385/136 |

\* cited by examiner

Primary Examiner—Javaid H. Nasri

(57) ABSTRACT

Optical ribbon cable fan-out device includes a top cover portion, a fan-out portion and a bottom portion formed as a unitary body. The fan-out portion has an array of guides housing individual fibers of the optical ribbon cable. The top cover portion and bottom cover portion are connected respectively to the fan-out portion by first and second hinges. The top cover portion and the bottom cover portion each have a plate projecting respectively therefrom to secure a ribbon cable in an axis extending longitudinally through the fan-out apparatus. The fan-out portion is so configured that a first portion of the arrayed guides is co-linear with the axis, a second portion of the arrayed guides is above the axis and a third of the arrayed guides is below the axis. The fan-out apparatus defines pathways for individual optical fibers having a bend radius of at least approximately 1.5 inches.

18 Claims, 4 Drawing Sheets

UNITARY FAN-OUT DEVICE FOR OPTICAL RIBBON CABLES

FIELD OF INVENTION

The present invention generally relates to optical fiber closures and, more particularly, to an optical fiber closure having improved optical fiber capacity and insertion loss characteristics.

BACKGROUND OF INVENTION

Optical communications refer to the medium and the technology associated with the transmission of information as light pulses. Many applications utilize an optical fiber network to establish optical communications between network locations. In order to enable optical communication and the flow of optical signals between network locations, various interconnections must be established between different optical fibers.

FIG. 1 depicts a fan-out device 100 associated with the prior art for handling optical fibers. Specifically, fan-out device 100 accepts a ribbon cable 102 which comprises a plurality of individual optical fibers 104. Such devices are used to separate the individual fibers 104 prior to their terminations onto optical connectors. A typical ribbon cable consists of 12 individual fibers. As these individual fibers are separated, they are subject to bending. The bend radius $R_B$ of the fibers is an important characteristic of the fan-out device because it corresponds to the degree of "light leakage" in each of the individual fibers. That is, as light propagates through an individual fiber, a portion of the light will travel beyond the boundaries of the fiber if $R_B$ is too small (corresponding to an angle of incidence of the light upon the fiber core that is greater than the critical angle for total internal reflection of the light). Current designs have $R_B$ of approximately 0.5 inches which results in unnecessarily high leakage of light and optical signal degradation.

Additionally, current fan-out devices comprise a two piece construction with an epoxy seal. Specifically, upper portion 106 and lower portion 108 are joined to protect the individual fibers 104 as they fan out. The epoxy is utilized to maintain an $R_B$ so that if a fiber is pulled, it will not kink and generate microbends. If this epoxy cures while the fiber is not set to the correct $R_B$, optical losses will result from this condition also. Moreover, as the upper portion 106 and lower portion 108 are joined, there may be alignment errors that cause severing or crimping of one of more of the individual fibers.

SUMMARY OF THE INVENTION

These and other deficiencies of the prior art are overcome according to the principles of the invention in an apparatus for fanning out an optical ribbon cable having a top cover portion, a fan-out portion and a bottom portion such that the three portions are formed as a unitary body with the fan-out portion having a stacked array of optical fiber guides for housing individual fibers of the optical ribbon cable. The top cover portion is connected to the fan-out portion by a first hinge and the bottom cover portion is connected to the fan-out portion by a second hinge. In one embodiment, the first hinge and second hinge are of the same material as the top cover portion and bottom cover portion. The material of which the apparatus is comprised is a substantially non-opaque material and in one embodiment on the invention is a polymer 12-based material.

A part of the fan-out portion transitions to a hook member. Additionally, a part of the top cover portion transitions to a partial tang and the bottom cover portion transitions to a partial tang to jointly define a complete tang. The hook member and complete tang facilitate securing the apparatus to a support structure.

The top cover portion has a plate projecting perpendicularly from a top cover portion front face and the bottom cover portion has a plate projecting perpendicularly from a bottom cover portion front face. The two plates secure a ribbon cable in an axis extending longitudinally through the fan-out apparatus. The fan-out portion of the apparatus is so configured that a first portion of the arrayed guides is co-linear with the longitudinally extending axis, a second portion of the arrayed guides is above the longitudinally extending axis and a third of the arrayed guides is below the longitudinally extending axis. The fan-out portion has a body having a front face and a rear face. The arrayed guides traverse longitudinally through the fan-out portion from the front face to the rear face. In one embodiment of the invention, the arrayed guides are in the form of a 3×8 matrix in the body. The arrayed guides are tapered such a width of each of said guides at the front face is wider than a width at the rear face. The fan-out apparatus also has an apparatus front face wherein the arrayed guides define pathways for individual optical fibers disposed from said apparatus front face to said fan-out portion rear face having a bend radius of at least approximately 1.5 inches.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
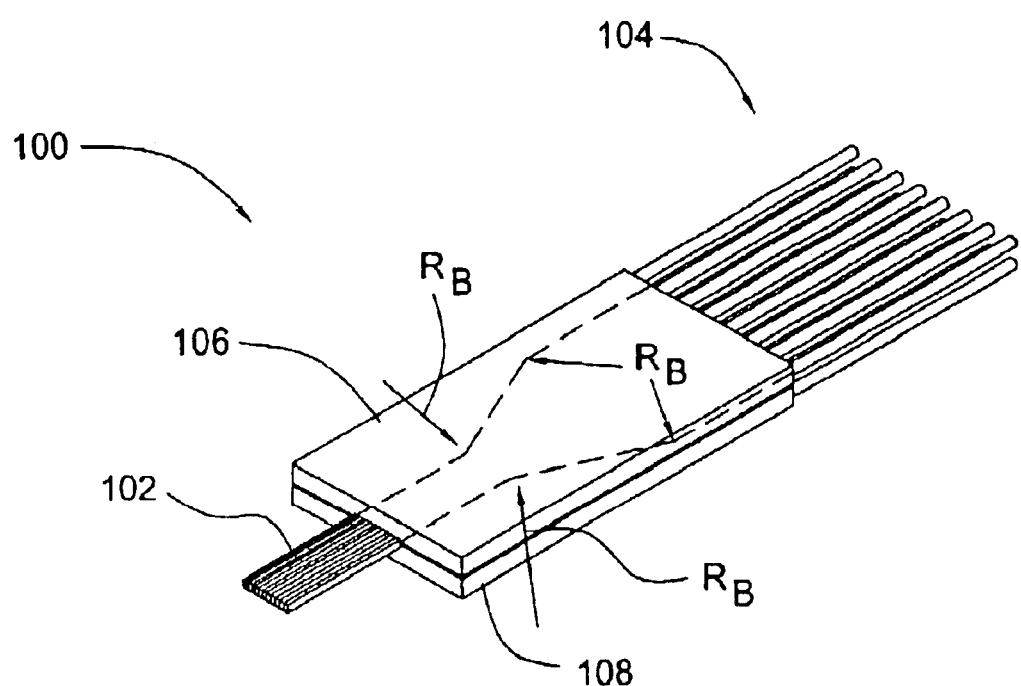
FIG. 1 depicts a fan-out device associated with the prior art.
Figure 2:
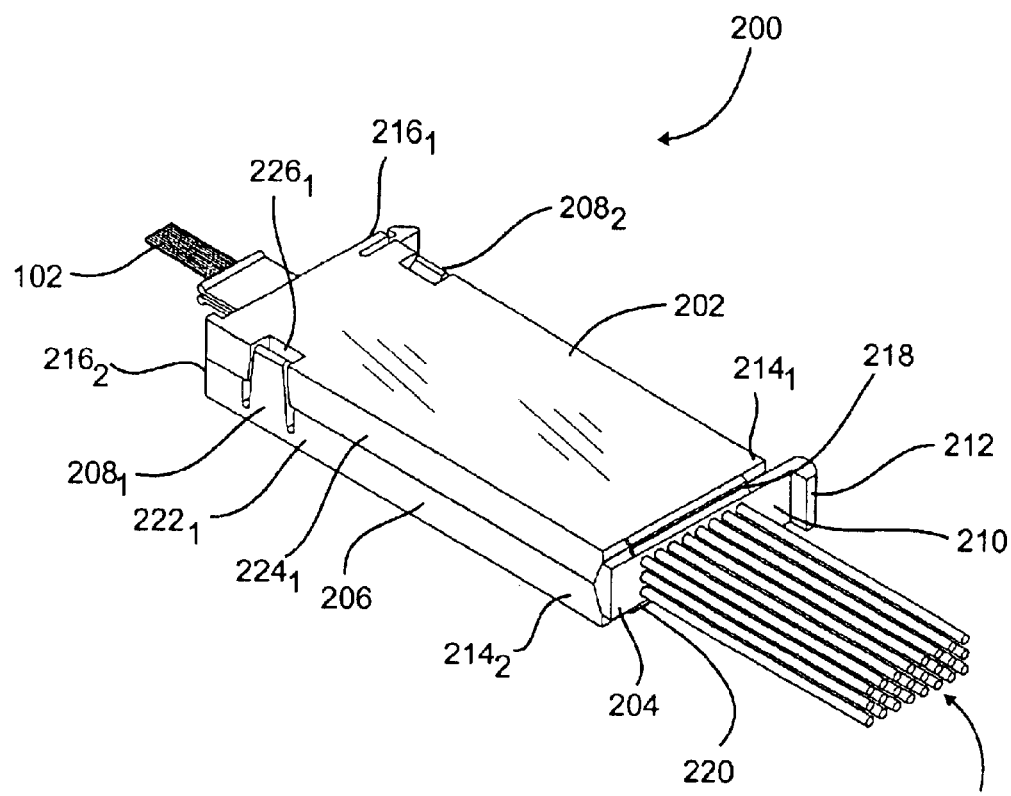
FIG. 2 depicts an isometric view of a fan-out device of the subject invention detailing the rear of the device.

FIG. 2 depicts an isometric view of a fan-out device 200 in accordance with the subject invention. The fan-out device 200 is capable of receiving a ribbon cable 102, separating out a plurality of optical fibers 104 (depicted as encased in buffer tubes) comprising said ribbon cable and presenting them in an organized fashion. This condition permits individual manipulation of each of said plurality of optical fibers 104 in such a manner so as to decrease losses associated with excessive bending of the individual fibers. Additionally, the subject invention is capable of handling larger numbers of fibers than previously realizable.

The fan-out device 200 comprises a top cover portion 202, a fan-out portion 204 and a bottom cover portion 206. The top cover portion 202 and bottom cover portion 206 are substantially identical in length to provide an enclosure (explained in greater detail below) for receiving the ribbon cable 102 and fanning out the plurality of individual fibers 104 in the ribbon cable 102. The fan-out device 200, and more specifically the portions comprising same, are fabricated from a polymer-12 based material. In one embodiment, the fan-out device 200 is fabricated from Grilamid which is a clear plastic material manufactured and sold by K-Mac Plastics of Kentwood, Mich. One skilled in the art will realize that other types of materials are suitable for the application. Such materials are, in one example, non-opaque and relatively durable (so as to withstand handling and installation into supporting frameworks and opening and closing of the device). For example, if the material is substantially transparent, the material is quite suitable for the purposes of visible examination of the fibers. If the material is translucent, the material should be reasonably visibly clear so as to allow viewing of the fibers as there are various degrees of translucency. It will also be realized that either the top cover portion 202 or bottom cover portion 206 or both components maybe be non-opaque depending upon the specific application or manufacturing process.

The top cover portion 202 has a rear section $214_1$ and a front section $216_1$. Similarly, bottom cover portion 206 has a rear section $214_2$ and a front section $216_2$. The top cover portion 202 is connected to the fan-out portion 204 at the top cover rear section $214_1$ via top hinge 218. Similarly, the bottom cover 206 is attached to fan-out portion 204 at the bottom cover rear section $214_2$ via bottom hinge 220. A double-hinged assembly 218/220 is thus created between the top cover portion 204, fan-out portion 204 and bottom cover portion 206 by joining these pieces in the manner prescribed. In each instance, top hinge 218 and bottom hinge 220 are relatively thin areas of material of which the fan-out device 200 is constructed. One skilled in the art will understand to make top hinge 218 and bottom hinge 220 substantially thin enough so as to provide hinged motion between the top cover portion 202, fan-out portion 204 and bottom cover portion 206 yet remain durable enough to maintain structural integrity of the overall device. It will also be understood to one skilled in the art that a thin layer material version of the fan-out device 200 is not the only way hinged attachment of these components can be made and that other suitable materials or methods of attachment are possible.

The bottom cover portion 206 further comprises a plurality of perpendicularly extending tangs $208_1$ and $208_2$. Specifically, and in one embodiment, first tang $208_1$ extends upward from first bottom cover portion side $222_1$ proximate front section $216_2$. Similarly, second tang $208_2$ extends upward from second bottom cover portion side $222_2$ (obscured in FIG. 2 but seen in FIG. 5) proximate front section $216_2$. Top cover portion 202 comprises a plurality of notches $226_1$ and $226_2$ for communicating with tangs $208_1$ and $208_2$ respectively. Specifically, first top cover notch $226_1$ is recessed in first top cover side $224_1$. Similarly, second top cover notch $226_2$ is recessed in second side $224_2$ on the top cover portion 202 (detailed in FIG. 5). Each of said tang/notch combination secures the top cover portion 202 to the bottom cover portion 206.

The fan-out portion 204 comprises a rear face 210 that defines the rear of the fan-out device 200. The rear face 210 is the point at which the individual fibers are first presented as they exit the fan-out device 200. The rear face 210 transitions into a hook element 212. The hook element 212 facilitates securing the fan-out device 200 to a framework for stabilizing same and the fibers contained therein.

Figure 3:
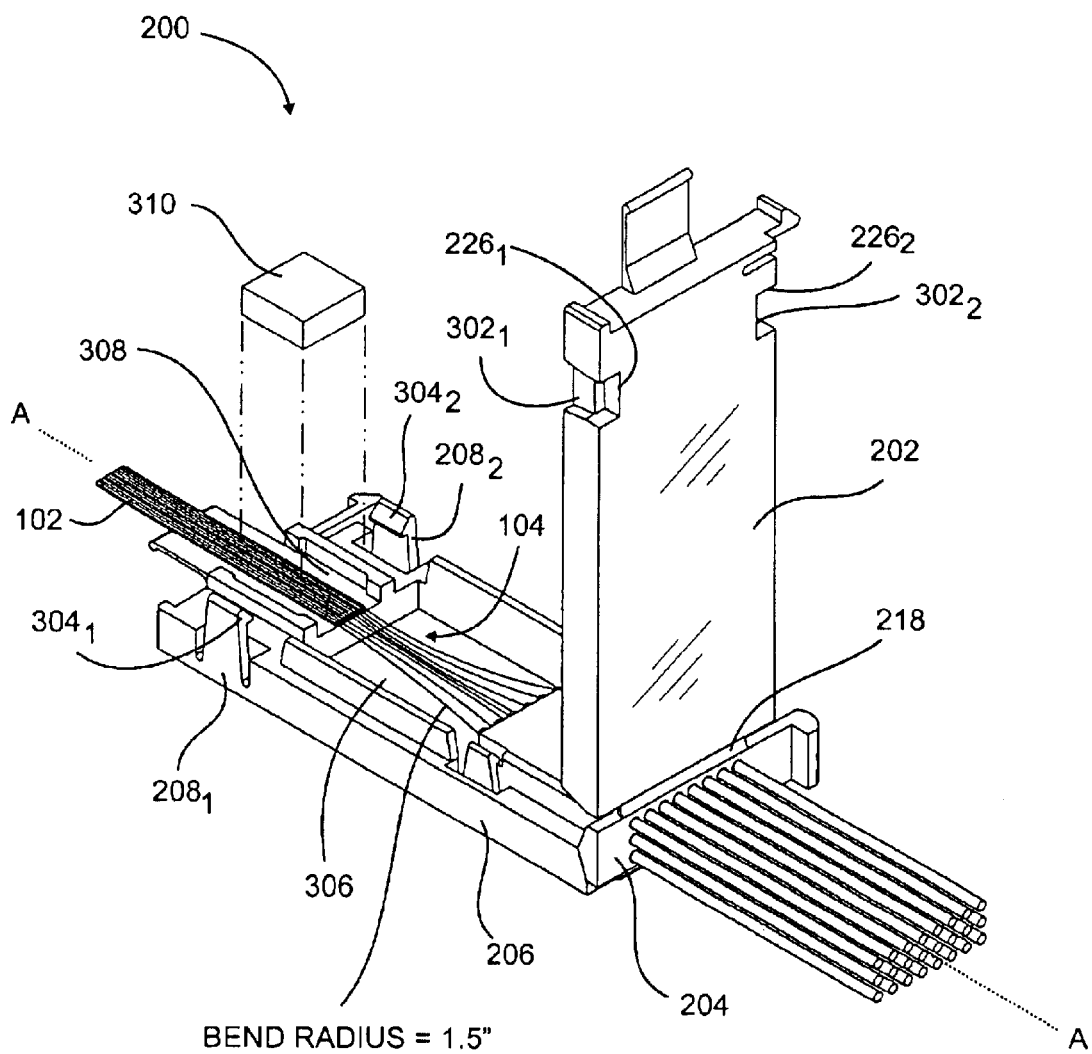
FIG. 3 depicts an isometric view of the fan-out device of FIG. 2 with the top cover portion partially open.

FIG. 3 depicts an isometric view of the fan-out device 200 with the top cover portion 202 partially open. From this vantage point, it is seen that first top cover notch $226_1$ further comprises a first ridge $302_1$ that first tang $208_1$ contacts until locking into place when the top cover portion 202 is closed. Similarly, second top cover notch $226_2$ further comprises a second ridge $302_2$, partially obscured, that second tang $208_2$ contacts until locking into place.

With the top cover portion 202 partially open, the internal configuration of the fan-out device 200 is more readily seen. Specifically, top cover portion 202, fan-out portion 204 and bottom cover portion 206 define a two-stage internal cavity 306/308. Specifically, a first internal cavity 306 houses the fan-out portion 204 and allows individual fibers 104 of the ribbon cable 102 to be spread apart. Second cavity 308 is forward of first cavity 306 and is smaller in volume so as to accept the ribbon cable 102 without undue gap or spacing between it and the fan-out device (thereby preventing undue bending or flexing of the ribbon cable which can cause breakage) as well as establishing an axis A for which the individual fibers can be referenced against. To further stabilize the ribbon cable 102 as it enters the second recess 308, a stabilizing block 310 is disposed on top of the ribbon cable 102. When top cover portion 204 is hinged closed over bottom portion 206, top portion 202 will slightly compress stabilizer block 310 so as to stabilize the ribbon cable 102 in the fan-out device 200.

Figure 4:
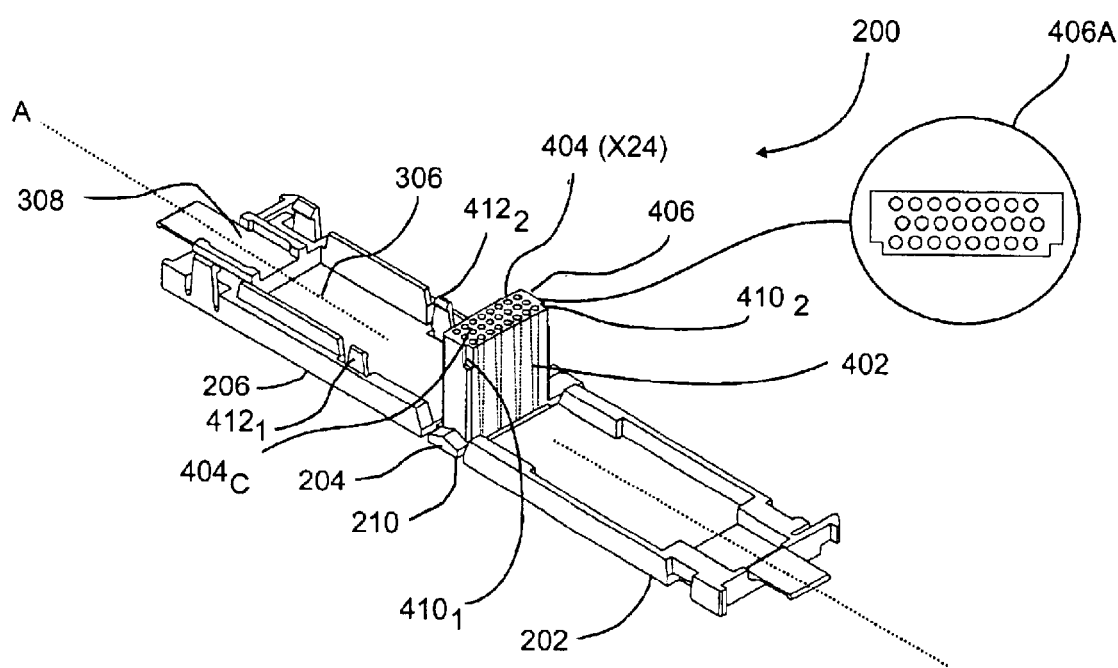
FIG. 4 depicts an isometric view of the fan-out device of FIG. 2 with the top cover fully open.

FIG. 4 depicts an isometric view of the fan-out device 200 with the top cover portion 202 fully open. In FIG. 4, it should be noted that the ribbon cable 102 and individual fibers 104 are not shown so as to facilitate viewing of the fan-out device 200. Specifically, with the top cover portion 202 fully open, the fan-out portion 204 is more readily seen and accessed. The fan-out portion 204 comprises a fiber holding body 402. The holding body 402 is substantially a solid block having a plurality of individual fiber optic cable guides 404 extending there through. Specifically, the guides 404 extend from a front face 406 of the body 402 to the rear face 210. The guides 404 are flared out slightly at the front face 406 to facilitate insertion of the individual fibers 104. In other words, a width of the guides at the front face 406 is wider than a width of the guides at the rear face 210. The individual guides 404 are arranged in a stacked layout. In one embodiment of the invention, there are 24 guides 404 arranged in a matrix. One example of the 24 guide matrix is 8 columns by 3 rows. It will be understood to those skilled in the art that other types of arrangements are possible (i.e., any n×m matrix that is suitable for handling the number of individual fibers 104, an offset or staggered layout where the guides 404 in one row are not aligned with a row of guides directly above or below (as depicted in the cutout of FIG. 4 depicting a front face 406A of an alternate fiber holding body) and the like) and the particularly disclosed embodiment is not the sole possible arrangement of guides 404. To minimize undue bending and flexing of the individual fibers as they approach the block 402, the fan-out device 200 is designed in such a manner that when fully closed (as shown in either FIGS. 2 or 5), a center row of guides $404_c$ will fall substantially within the axis A that the ribbon cable 102 is aligned.

Body 402 is further provided with a first recess $410_1$ and a second recess $410_2$ disposed on opposite sides of said body 402 at the front face 406. Additionally, first body tang $412_1$ and second body tang $412_2$ extend perpendicularly from bottom cover portion 206 in a similar fashion as first tang $208_1$ and second tang $208_2$ described earlier. As the top cover portion 202 is hinged over and closes upon bottom cover portion 206, the body 402, which is integral with hinge portion 204, comes into contact with the first body tang $412_1$ and second body tang $412_2$ in such a manner so as to positively lock the body 402 in place when the first body tang 412, engages first recess $410_1$ and second body tang $412_2$ engages second recess $410_2$.

Figure 5:
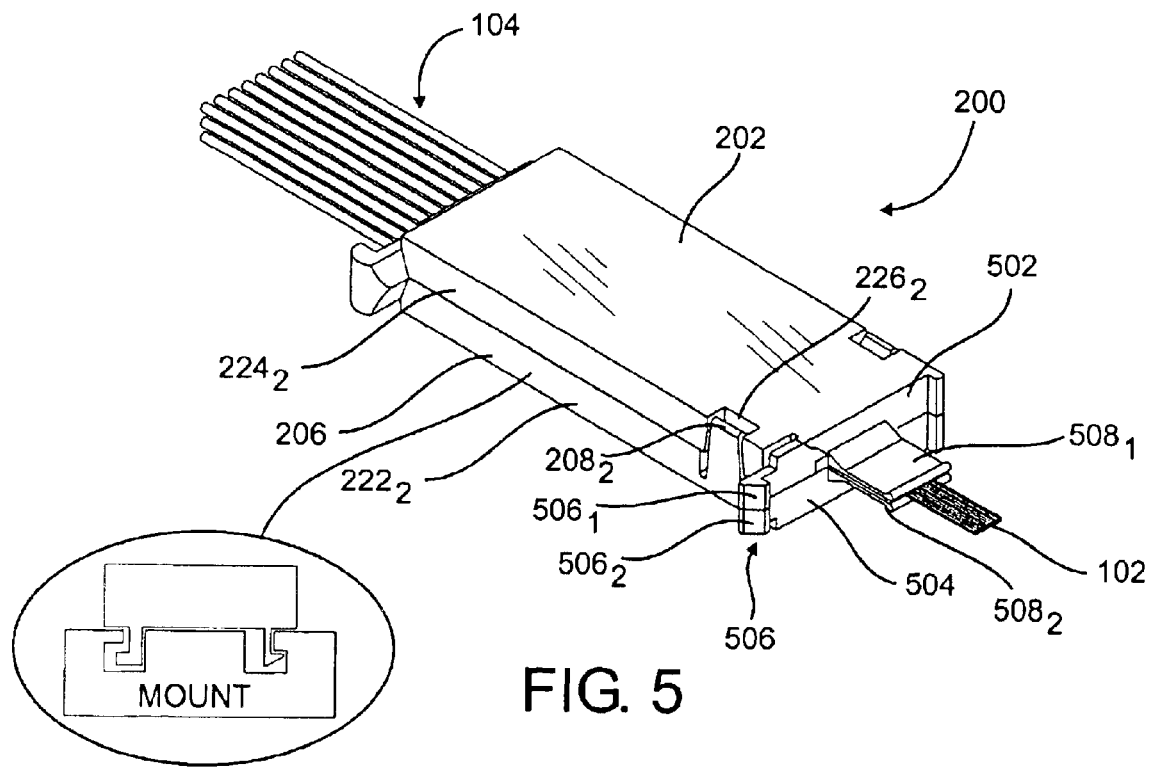
FIG. 5 depicts an isometric view of the fan-out device of the subject invention detailing the front of the device.

FIG. 5 depicts an isometric view of the fan-out device 200 of the subject invention detailing the front of the device. The top cover portion 202 further comprises a front face 502. Similarly, the bottom cover portion 206 comprises a front face 504. The respective front faces 502 and 504 are substantially within the same plane. The top cover portion front face 502 includes a first tang portion $506_1$ at one end of its face. Similarly, bottom portion cover face 504 includes a second tang portion $506_2$ at one end. Collectively, front face tangs $506_1$ and $506_2$ form a single complete tang 506 for securing the fan-out device 200 into a board, frame or other type of frame component within the fiber optic system. Specifically, the tang 506 provides a releasable locking mechanism to secure the fan-out device 200 and allow for a hinged motion of same about hook member 212.

Top front face 502 further includes a top plate 508, projecting perpendicularly from front face 502. Similarly, bottom front face 504 includes a bottom plate $508_2$ projecting perpendicularly from bottom portion face of 504. Plates $508_1$ and $508_2$ close upon and clamp down the incoming ribbon cable 102. This arrangement secures the ribbon cable 102 in the axis A and prevents undue flexing or bending of such as it approaches the fan-out device 200.

The advantages of the subject invention are readily realized. Specifically, the unitary construction of the device 200 facilitates handling (i.e., opening and closing) of the device 200 without the problem of misalignment of the top cover portion and bottom cover portion. The total number of molds to create the device (and parts resulting therefrom) is reduced from three to one. The increased length of the housing and configuration of the individual fiber optic guides 404 increase the $R_B$ to approximately 1.5 inches which meets the requirements for the fiber optic cables protected therein. In other words, pathways for the individual fibers 104 are defined in the two cavities 306 and 308 and at the front face 404 of the fan-out body 402 such that the $R_B$ is at the much more acceptable value. Accordingly, the device results in a very low loss characteristic from light leakage. The non-opaque material used for to fabricate the device facilitates visual inspection without having to handle the device of the fibers contained therein. Lastly, the design of the device allows for double the amount of individual fibers to be handled per device in comparison to the prior art. That is, a holding body as described contains an array of 24 individual guides for receiving 24 individual fibers as opposed to the current designs that only hold 12 fibers. The latest ribbon cables having 24 individual fibers can thus be integrated into a system and handled with ease by the subject invention. The design also allows flexibility in planning an optical network as any number of individual fibers between 3 and 24 can be properly fanned out.

Although various embodiments that incorporate the teachings of the present invention have been shown and described in detail herein, those skilled in the art can readily devise many other varied embodiments that still incorporate these teachings.

What is claimed is:

1. Apparatus for fanning out a plurality of individual optical fibers in an optical fiber ribbon cable comprising:
   a top cover portion;
   a fan-out portion; and
   a bottom portion;
   said three portions formed as a unitary body with the fan-out portion further comprising a stacked array of optical fiber guides, wherein the top cover portion is hinged to the fan-out portion and the bottom cover portion is hinged to the fan-out portion.

2. The apparatus of claim 1 further comprising an apparatus front face wherein the arrayed guides define pathways for individual optical fibers disposed from said apparatus front face to said fan-out portion rear face having a bend radius of at least approximately 1.5 inches.

3. The apparatus of claim 1 wherein the first hinge and second hinge are of the same material as the top cover portion and bottom cover portion.

4. The apparatus of claim 3 wherein the material of which the apparatus is comprised is non-opaque material.

5. The apparatus of claim 4 wherein the non-opaque material is selected from the group consisting of a polymer 12-based material, grilamid and nylon.

6. The apparatus of claim 1 wherein a part of the fan-out portion transitions to a hook member.

7. The apparatus of claim 6 wherein a part of the top cover portion transitions to a partial tang, the bottom cover portion transitions to a partial tang, the top cover portion partial tang and bottom cover portion partial tang thereby defining a complete tang.

8. The apparatus of claim 7 wherein the hook member and complete tang facilitate securing the apparatus to a support structure.

9. The apparatus of claim 1 wherein the top cover portion further comprises a plate projecting perpendicularly from a top cover portion front face and the bottom cover portion further comprises a plate projecting perpendicularly from a bottom cover portion front face.

10. The apparatus of claim 9 wherein the top cover portion plate and the bottom cover portion plate secure a ribbon cable in an axis extending longitudinally through the apparatus.

11. The apparatus of claim 10 wherein a first portion of the arrayed guides is co-linear with the longitudinally extending axis.

12. The apparatus of claim 11 wherein a second portion of the arrayed guides is above the longitudinally extending axis and a third of the arrayed guides is below the longitudinally extending axis.

13. The apparatus of claim 1 wherein the fan-out portion further comprises a body having a front face and a rear face and the arrayed guides traverse longitudinally through the fan-out portion from the front face to the rear face.

14. The apparatus of claim 13 wherein the arrayed guides are in the form of an n×m matrix in the body.

15. The apparatus of claim 14 wherein the n×m matrix is a 3×8 matrix.

16. The apparatus of claim 13 wherein the arrayed guides are tapered such that a width of each of said guides at the front face is wider than a width at the rear face.

17. The apparatus of claim 13 wherein the guides are arranged in staggered (offset) rows.

18. Apparatus for fanning out a plurality of optical fibers comprising:
   a top cover portion, a fan-out portion, and a bottom portion defining:
      a first cavity for receiving a ribbon cable of individual optical fibers;
      a second cavity for fanning out said individual optical fibers;
      a fan-out body disposed in the second cavity for receiving the individual optical fibers; and
      the fan-out body and cavities dimensioned to provide a bend radius of each of the individual optical fibers of at least approximately 1.5 inches, wherein the top cover portion is hinged to the fan-out portion and the bottom cover portion is hinged to the fan-out portion.

* * * * *